: 2,963,495

12α-HALO-3,11-OXYGENATED-17α-HYDROXY-20 OXO STEROIDS OF THE PREGNANE SERIES

Josef Fried and Josef E. Herz, New Brunswick, N.J., assignors to Olin Mathieson Chemical Corporation, New York, N.Y., a corporation of Virginia No Drawing. Filed Apr. 5, 1956, Ser. No. 576,259

8 Claims. (Cl. 260—397.45)

This application is a continuation-in-part of our parent application Serial No. 519,682, filed July 1, 1955.

This invention relates to the synthesis of valuable steroids; and it has for its object the provision of (I) an advantageous process of preparing steroids of the pregnane (including the allopregnane, pregnene and pregnadiene) series having a 12α-halogen substituent and an 11-keto or 11β-hydroxy substituent, and of (II) certain steroids useful themselves as physiologically active steroids or as intermediates in the preparation of said physiologically active steroids.

The process of this invention essentially comprises: (a) converting a 3β-acyloxy-11β,12β-epoxy-5α,22 (either a or b)-spirostane to the corresponding 12α-halo-11β-hydroxy derivatives; (b) oxidizing said derivative to the 12α-halo-11-keto derivative; (c) opening the F-ring to produce a 12α - halo - Δ$^{20(22)}$ - furostene - 11 - one-3β,26-diol 3,26-diacylate; (d) opening the E ring to produce a 12α-halo-allopregnane-11,20-dione-36β,16β-diol 3-acylate, 16-(4-methyl-5-acyloxy)pentanoate; (e) converting said allopregnane to a 12α-halo-allopregnane-16α,17α-oxido - 11,20 - dione - 3α - ol 3 - acylate either directly or through the 12α-halo-Δ$^{16}$-allopregnene-11,20-dione-3β-ol 3-acylate derivative; (f) converting said epoxide to a 12α-halo-16β-iodo (or bromo) - allopregnane - 11,20 - dione-3β,17α-diol 3-acylate derivative; and (g) dehalogenating the latter to the corresponding 12α-halo-allopregnane-11,20-dione-3β,17α-diol 3-acylate derivative.

The resultant 12α - halo - allopregnane - 11,20 - dione-3β,17α-diol 3-acylate can then be saponified to the corresponding 12α-halo-allopregnane-11,20-dione-3β,17α-diol, which in turn can either be converted to the corresponding 12α-halo-3,20-diketo-17α-hydroxy-11β-hydroxy (or 11-keto)-steroids of the pregnene series (for example: 12α - halo - Δ$^4$ - pregnene - 17α - ol - 3,11,20 - trione; 12α - halo - Δ$^4$ - pregnene - 11β,17α - diol - 3,20 - dione; 12α - halo - Δ$^{1,4}$ - pregnadiene - 17α - ol - 3,11,20 - trione; and 12α - halo - Δ$^{1,4}$ - pregnadiene - 11β,17α - diol - 3,20 - dione) or to the corresponding 12α - halo - 3,20 - diketo-17α,21-dihydroxy-11β-hydroxy (or 11-keto)-steroids of the pregnene series or 21-esters thereof [e.g., 12α-halo-Δ$^4$-pregnene-17α,21-diol-3,11,20-trione and esters thereof (particularly esters with hydrocarbon carboxylic acids of less than ten carbon atoms as exemplified by acetic and benzoic acid esters), 12α-halo-Δ$^4$-pregnene-11β,17α,21-triol-3,20-dione and 21-esters thereof, 12α-halo-Δ$^{1,4}$-pregnadiene-17α,21-diol-3,11,20-trione and esters thereof, and 12α - halo - Δ$^{1,4}$ - pregnadiene - 11β,17α,21 - triol - 3,20 - dione and esters thereof]. This series of conversions is effected by oxidizing the 12α-halo-allopregnane-11,20-dione-3β,17α-diol [after treatment with bromine to form the corresponding 12α-halo-21-bromo-allopregnane-11,20-dione-3β,17α-diol derivative and converting the latter with an alkali salt of an organic acid to the corresponding 12α - halo - allopregnane - 11,20 - dione - 3β,17α, 21-triol 21-acylate derivative if a 21-hydroxy steroid is desired] to the corresponding 12α-halo-allopregnane-3,11,20-trione-17α-ol, and thence to a 2α,4α-dibromo-12α-halo-allopregnane-17α-ol-3,11,20-trione by treatment with bromine. The dibromide can then either be converted directly to a 12α-halo-Δ$^{1,4}$-pregnadiene-17α-ol-3,11,20-trione by means of a tertiary base (e.g., collidine) or to a 12α-halo-Δ$^4$-pregnene-17α-ol-3,11,20-trione via the 2α-iodo - 12α - halo - Δ$^4$ - pregnene - 17α - ol - 3,11,20 - trione intermediate. To convert the resultant 11-keto steroid to the corresponding 11β-hydroxy derivative, two different series of reactions are possible. First, the 12α-halo-3,11,20-triketo-17α-hydroxy steroid can be reacted with a semicarbazide to give the 11-keto-3,20-disemicarbazone, thence to the 11β-hydroxy-3,20-disemicarbazone by means of an alkali metal boron tetrahydride and finally to the 11β-hydroxy-3,20-diketone by reaction with nitrous acid; or second, the 12α-halo-3,11,20-triketo-17α-hydroxy steroid can be converted to the 3,20-diketal-11-ketone derivative, treated with alkali metal boron tetrahydride to form the 3,20-diketal-11β-hydroxy derivative and then hydrolyzed to yield the 11β-hydroxy-3,20-diketone.

The 3,20-diketal-11β-hydroxy serves the additional function of being an intermediate for the preparation of 12α-halo-11β-hydroxy (or 11-keto) derivatives generally, since this intermediate upon reaction with a base yields the 11β,12β-epoxide-3,20-diketal which can be hydrolyzed by means of a dilute acid to the 11β,12β-epoxide-3,20-diketone, which in turn can be treated in the usual manner with a hydrohalic acid to form the 12α-halo-11β-hydroxy derivative (which can, if desired, be oxidized to the 12α-halo-11-keto derivative).

The compounds of this invention comprise: (A) 12α-fluoro-5α-spirostane-3β,11β-diol 3-acylate (preferably the esters thereof with hydrocarbon carboxylic acids having less than ten carbon atoms as exemplified by the acetate and benzoate); (B) 12α-halo (preferably chloro or fluoro)-5α-spirostane-3β-ol-11-one 3-acylate; (C) 12α-halo (preferably chloro or fluoro)-Δ$^{20(22)}$-furostene-3β,26-diol-11-one 3,26-diacylate; (D) 12α-halo (preferably chloro or fluoro)-allopregnane-3β,16β-diol-11,20-dione 3-acylate 16-(4-methyl-5-acyloxy)pentanoate; (E) 12α-halo (preferably chloro or fluoro)-Δ$^{16}$-allopregnane-3β-ol-11,20-dione 3-acylate; (F) 12α-halo (preferably chloro or fluoro) - allopregnane - 16α,17α - oxido - 3β - ol - 11,20-dione 3-acylate; (G) 12α-halo (preferably chloro or fluoro)-16β-bromo (or iodo)-allopregnane-3β,17α-diol-11,20-dione 3-acylate; (H) 12α-halo steroids of the general formula

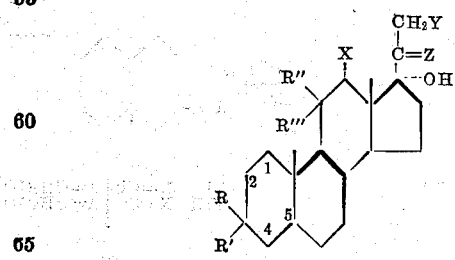

wherein the 1,2 and 4,5 positions are either saturated or double-bonded, R is hydrogen, R' is hydroxy or acyloxy (preferably an ester of a hydrocarbon carboxylic acid having less than ten carbon atoms), or together R and R' is keto, ketal (preferably either a ketal of a lower alkanol or a lower alkanediol), or semicarbazone [it being understood that if R and R' is ketal, the double bond, if any, in the 4,5-position shifts to the 5,6-position], R'' is hydrogen, R''' is β-hydroxy, or together R'' and R''' is keto; X is α-halo; Y is hydrogen, bromine, hydroxy or acyloxy (preferably an ester of a hydrocarbon carboxylic acid having less than ten carbon atoms), and Z is keto, ketal (preferably either a ketal of a lower alkanol or a lower alkanediol) or semicarbazone; (I) 2α,4α-dibromo-12α-halo steroids of the general formula

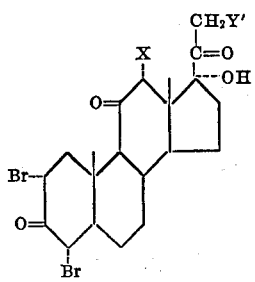

wherein X is α-halo (preferably chloro or fluoro) and Y' is hydrogen, hydroxy or acyloxy (preferably an ester of a hydrocarbon carboxylic acid having less than ten carbon atoms); (J) 2α-iodo-12α-halo steroids of the general formula

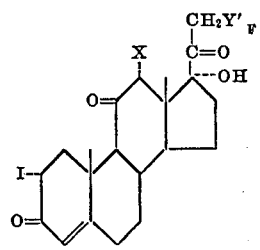

wherein X and Y' are as hereinbefore defined; and (K) 11β,12β-epoxy steroids of the general formula wherein the 1,2 and 4,5-positions are either saturated or double-bonded (preferably the 1,2-position is saturated and the 4,5-position is double-bonded), and Z' is keto or ketal (preferably either a ketal of a lower alkanol or a lower alkanediol) [it being understood that if R and R' is ketal, the double bond, if any, in the 4,5-position shifts to the 5,6-position], and Y' is as hereinbefore defined.

The final products of this invention [Compounds H, wherein the 4,5-position is double-bonded and Z and R+R' are keto] are physiologically active steroids which possess glucocorticoid as well as mineralocorticoid activity. Thus, these new steroids of this invention can be administered instead of, and in the same manner as, cortisone or hydrocortisone in the treatment of rheumatoid arthritis and dermatomyositis, or in the same manner as desoxycorticosterone in the treatment of Addison's disease or adrenal insufficiencies. The dosage for such administration is, of course, dependent on the relative activity of the compound. The 12α-bromo-11-keto-steroids are of further use as intermediates in the preparation of the corresponding 12-debromo derivatives, to which they are converted by treatment with either zinc dust in acetic acid or chromous chloride.

For a clearer understanding of the foregoing general and following detailed description of the processes of this invention, reference is made to the following schematic analysis, wherein the capital letters designate the general class of compounds and the Roman numerals the specific embodiments thereof of the examples:

I   X=F; A=CH₃CO
II  X=Cl; A=CH₃CO

III X=Cl; A=CH₃CO
IV  X=F; A=CH₃CO

V   X=Cl; A=CH₃CO
VI  X=F; A=CH₃CO

VII  X=Cl; A=CH₃CO
VIII X=F; A=CH₃CO

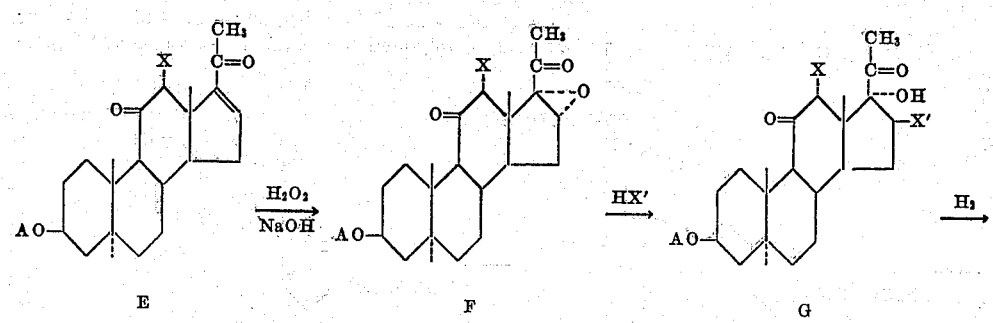

E
IX   X=Cl; A=CH₃CO
X    X=F; A=CH₃CO

F
XI   X=Cl; A=CH₃CO
XII  X=F; A=CH₃CO

G
XIII  X=Cl; X'=Br; A=CH₃CO
XIV   X=Cl; X'=I; A=CH₃CO
XV    X=F; X'=I; A=CH₃CO

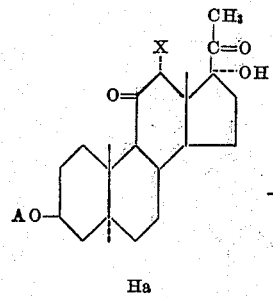

Ha
XVI   X=Cl; A=CH₃CO
XVII  X=F; A=CH₃CO

Hb
XVIII  X=Cl
XIX    X=F

Hc
XX   X=Cl
XXI  X=F

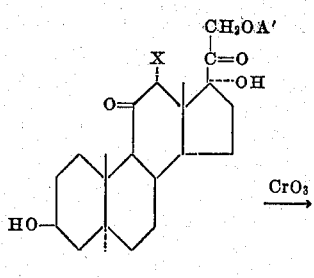

Hd
XXII   X=Cl; A'=CH₃CO
XXIII  X=F; A'=CH₃CO

He
XXIV   X=Cl; Y'=CH₃COO
XXV    X=F; Y'=CH₃COO
XXVI   X=Cl; Y'=H
XXVII  X=F; Y'=H

I
XXVIII  X=Cl; Y'=CH₃COO
XXIX    X=F; Y'=CH₃COO
XXX     X=Cl; Y'=H
XXXI    X=F; Y'=H

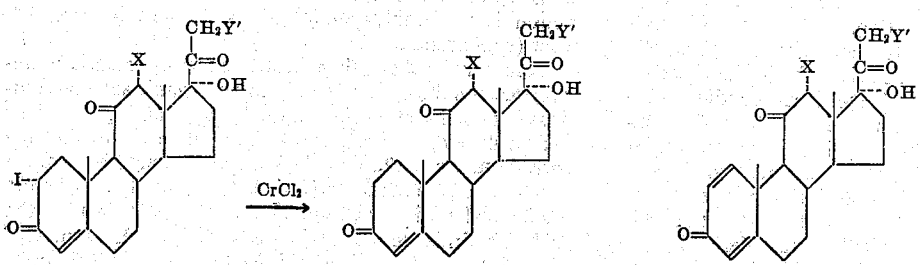

J
XXXII   X=Cl; Y'=CH₃COO
XXXIII  X=F; Y'=CH₃COO
XXXIV   X=Cl; Y'=H
XXXV    X=F; Y'=H

Hf
XXXVI    X=Cl; Y'=CH₃COO
XXXVII   X=F; Y'=CH₃COO
XXXVIII  X=Cl; Y'=H
XXXIX    X=F; Y'=H

Hg
XL    X=Cl; Y'=CH₃COO
XLI   X=F; Y'=CH₃COO
XLII  X=Cl; Y'=H
XLIII X=F; Y'=H

Compounds H containing oxo radicals in the 3- and 11-positions can then be converted to the corresponding 11β-hydroxy derivatives or to an 11-keto or 11β-hydroxy derivative having a different halogen substituent in the 12α-position by the following series of steps:

Compounds A are then oxidized, as by treatment with chromic oxide, to the corresponding 12α-halo-11-keto-3β-acyloxy-5α-spirostane derivative, Compounds B [e.g., 12α - chloro - 5α,22a - spirostane - 3β - ol - 11 - one 3-acetate, Compound III, and 12α-fluoro-5α,22a-spiro-

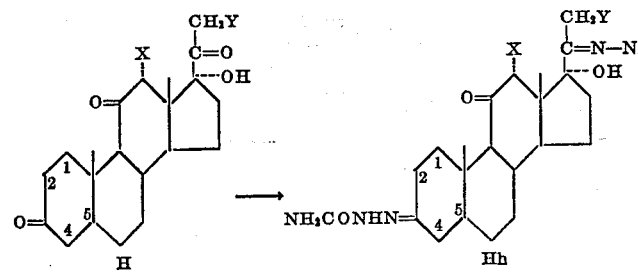
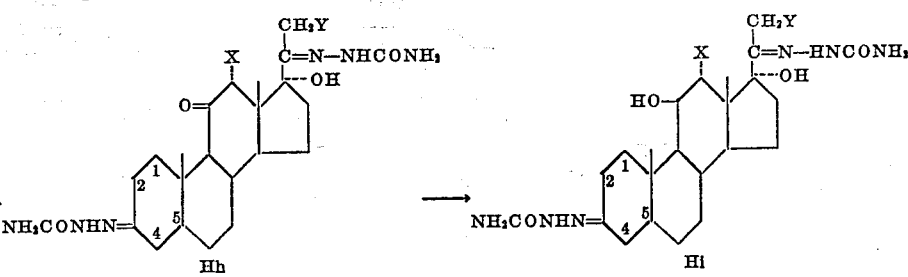
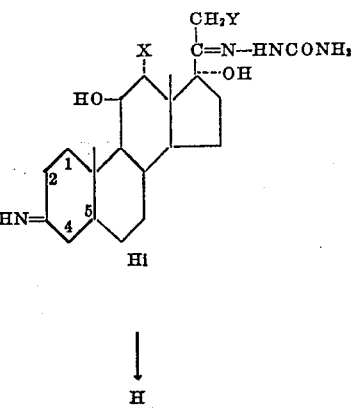

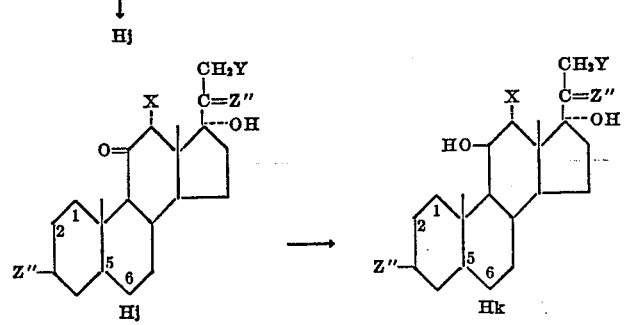
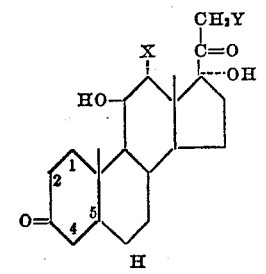

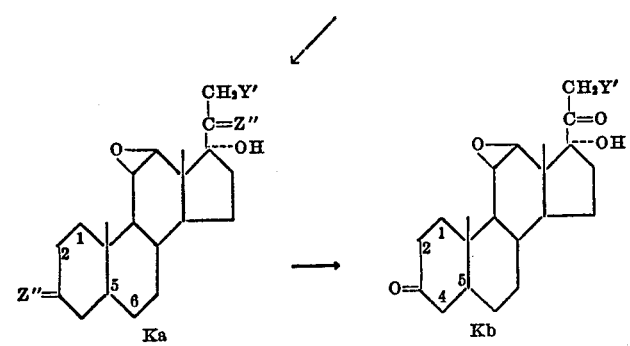

To prepare the steroids of this invention, 3β-acyloxy-11β,12β-epoxy-5α-spirostane (e.g., 3β-acetoxy-11β,12β-epoxy-5α,22a-spirostane) is treated with a hydrohalic acid (preferably either hydrochloric or hydrofluoric acid) in the usual manner to yield the corresponding 12α-halo (preferably chloro or fluoro)-11β-hydroxy-3β-acyloxy-5α-spirostane, Compounds A, [e.g., 12α-chloro-5α,22a-spirostane-3β,11β-diol 3-acetate, Compound I, and 12α-fluoro-5α,22a-spirostane-3β,11β-diol 3-acetate, Compound II]. The esterifying radical in the 3-position will depend, of course, on the particular ester derivative of the epoxyspirostane initially chosen, and since the sole function of this ester group is to protect the 3β-hydroxyl radical, any acid is utilizable. Because of their availability, however, the preferred acids are those of hydrocarbon carboxylic acids containing less than ten carbon atoms and include the lower alkanoic acids (e.g., acetic, propionic, and enanthic acids), the aromatic acids (e.g., benzoic, toluic and xyloic acids), the cycloalkanoic acids (e.g., cyclohexanecarboxylic acid), and the aralkanoic acids (e.g., phenylacetic and phenylpropionic acid).

stane-3β-ol-11-one 3-acetate, Compound IV]. This reaction is preferably conducted in an inert organic solvent (e.g., acetone).

Compounds B are then heated under substantially anhydrous conditions, preferably in an organic solvent comprising an acid anhydride and a Lewis acid, e.g., pyridine hydrochloride, to open the F ring, thereby yielding the corresponding 12α-halo-11-keto-3β-acyloxy-Δ$^{20(22)}$-furostene-26-ol 26-acylate derivative, Compounds C, wherein the 26-acyl radical corresponds to the acyl radical of the acid anhydride employed in the reaction. Examples of such furostene derivatives include 12α-chloro-Δ$^{20(22)}$-furostene-3β,26-diol-11-one 3,26-diacetate, Compound V, and 12α-fluoro-Δ$^{20(22)}$-furostene-3β,26-diol-11-one 3,26-diacetate, Compound VI. The reaction is preferably effected by refluxing the spirostane and pyridine hydrochloride in acetic anhydride under anhydrous conditions.

Compounds C are then oxidized either by means of a peracid (e.g., peracetic acid formed in situ by means of acetic acid and hydrogen peroxide) or chromic acid to yield the corresponding 12α-halo-11-keto-3β-acyloxyallopregnane - 16β - ol - 20 - one 16 - (4 - methyl - 5-acyloxy)pentanoate, Compounds D [e.g., 12α-chloro-allopregnane-3β,16β-diol-11,20-dione 3-acetate, 16-(4-methyl-5-acetoxy)pentanoate, Compound VII, and 12α-fluoro-allopregnane-3β,16β-diol-11,20-dione 3-acetate, 16-(4-methyl-5-acetoxy)-pentanoate, Compound VIII].

Compounds D can then either be dehydrated by treatment with a base (e.g., potassium hydroxide) to the corresponding 12α-halo-11-keto-3β-acyloxy-Δ¹⁶-allopregnene-20-one, Compounds E (e.g., 12α-chloro-Δ¹⁶-allopregnene-3β-ol-11,20-dione 3-acetate, Compound IX, or 12α-fluoro-Δ¹⁶-allopregnene-3β-ol-11,20-dione 3-acetate, Compound X), and thence by treatment of the resultant Compounds E with hydrogen peroxide and an alkali hydroxide or carbonate to the corresponding 12α-halo-11 - keto - 3β - acyloxy - allopregnane - 16α,17α - oxido-20-one, Compounds F (e.g., 12α-chloro-allopregnane-16α,17α-oxido-3β-ol-11,20-dione 3-acetate, Compound XI, or 12α-fluoro-allopregnane-16α,17α-oxido-3β-ol-11,20-dione 3-acetate, Compound XII) or directly to Compounds F by treatment of Compounds D with hydrogen peroxide in a basic medium (e.g., methanolic sodium hydroxide).

Compounds F are then hydrohalogenated by treatment with either hydrobromic or hydroiodic acid to yield the corresponding 12α-halo-16β-bromo (or iodo)-11-keto-3β-acyloxy-allopregnane-17α-ol-20-one derivatives, Compounds G (e.g., 12α-chloro-16β-bromo-allopregnane-3β,17α-diol-11,20-dione 3-acetate, Compound XIII, 12α-chloro - 16β - iodo - allopregnane - 3β,17α - diol - 11,20-dione 3-acetate, Compound XIV, and 12α-fluoro-16β-iodo - allopregnane - 3β,17α - diol - 11,20 - dione 3-acetate, Compound XV).

Compounds G are then dehalogenated in the 16-position by treatment with a reducing agent such as Raney nickel or palladium and hydrogen to yield the corresponding 12α-halo-11-keto-3β-acyloxy-allopregnane-17α-ol-20-one derivatives, Compounds Ha (e.g., 12α-chloro-allopregnane-3β,17α-diol-11,20-dione 3-acetate, Compound XVI, and 12α-fluoro-allopregnane-3β,17α-diol-11,20-dione, Compound XVII).

Compounds Ha can then be saponified by treatment with an acid (e.g., perchloric acid) or base (e.g., potassium carbonate) in a lower alcohol to yield the corresponding 12α-halo-allopregnane-3β,17α-diol-11,20-dione, Compounds Hb (e.g., 12α-chloro-allopregnane-3β,17α-diol-11,20-dione, Compound XVIII, and 12α-fluoro-allopregnane-3β,17α-diol-11,20-dione, Compound XIX).

If a 21-hydroxy steroid is desired, Compounds Hb are then brominated in the 21-position by treatment with bromine in an inert organic solvent to yield the corresponding 12α - halo - 21 - bromo - allopregnane - 3β,17α-diol-11,20-dione, Compounds Hc (e.g., 12α-chloro-21-bromo-allopregnane-3β,17α-diol-11,20-dione, Compound XX, and 12α-fluoro-21-bromo-allopregnane-3β,17α-diol-11,20-dione, Compound XXI) in which the 21-bromine atom is then replaced by an acyloxy group by means of an alkali salt of an organic acid, preferably acetic acid, whereby the resultant 21-substituent is an ester of the acid employed, to yield the corresponding 12α-halo-21 - acyloxy - allopregnane - 3β,17α - diol - 11,20 - dione, Compounds Hd (e.g., 12α-chloro-allopregnane-3β,17α,21-triol-11,20-dione 21-acetate, Compound XXII, and 12α - fluoro - allopregnane - 3β,17α,21 - triol - 11,20-dione 21-acetate, Compound XXIII), which may then be hydrolized, if desired, to yield the free 21-hydroxyl derivatives.

Compounds Hd or Compounds Hb (if a 21-unsubstituted steroid is desired) are then oxidized by treatment with chromic acid to yield the corresponding 12α-halo-3,11-diketo-allopregnane, Compounds He (e.g. 12α-chloro - allopregnane - 17α,21 - diol - 3,11,20 - trione 21-acetate, Compound XXIV, 12α-fluoro-allopregnane-17α,21-diol-3,11,20-trione 21-acetate, Compound XXV, 12α - chloro - allopregnane - 17α - ol - 3,11,20 - trione, Compound XXVI, and 12α-fluoro-allopregnane-17α-ol-3,11,20-trione, Compound XXVII).

To introduce a double-bond in the 4,5-position, Compounds He are treated with at least two moles of bromine per mole of steroid, whereby 12α-halo-2α,4α-dibromo-allopregnane derivatives, Compounds I are formed (e.g., 12α - chloro - 2α,4α - dibromo - allopregnane-17α,21-diol-3,11,20-trione 21-acetate, Compound XXVIII, 12α - fluoro - 2α,4α - dibromo - allopregnane - 17α,21-diol-3,11,20-trione 21-acetate, Compound XXIX, 12α-chloro - 2α,4α - dibromo - allopregnane - 17α - ol - 3,11,20 - trione, Compound XXX, and 12α - fluoro - 2α,4α-dibromo - allopregnane - 17α - ol - 3,11,20 - trione, Compound XXXI).

To prepare the corresponding Δ⁴-pregnene, Compounds I are heated with an iodide salt (e.g., sodium iodide) whereby the corresponding 12α-halo-2α-iodo-Δ⁴-pregnene derivative, Compounds J, are formed (e.g., 12α-chloro-2α-iodo-cortisone 21-acetate, Compound XXXII, 12α-fluoro-2α-iodo-cortisone 21-acetate, Compound XXXIII, 12α - chloro - 2α - iodo - 11 - keto - 17α - hydroxyprogesterone, Compound XXXIV, and 12α-fluoro-2α-iodo-11-keto-17α-hydroxyprogesterone, Compound XXXV), and the iodo radical is removed by reaction with a reducing agent such as aqueous chromous chloride to yield Compounds Hf (e.g., 12α-chloro-cortisone 21-acetate, Compound XXXVI, 12α-fluoro-cortisone 21-acetate, Compound XXXVII, 12α-chloro-11-keto-17α-hydroxyprogesterone, Compound XXXVIII, and 12α-fluoro-11-keto-17α-hydroxyprogesterone, Compound XXXIX).

To obtain a Δ¹,⁴-pregnadiene derivative, Compounds I are heated with collidine to yield the corresponding Δ¹,⁴-pregnadiene derivative, Compounds Hg (e.g., 12α-chloro - Δ¹,⁴ - pregnadiene - 17α,21 - diol - 3,11,20 - trione 21-acetate, Compound XL, 12α-fluoro-Δ¹,⁴-pregnadiene-17α,21-diol-3,11,20-trione 21-acetate, Compound XLI, 12α - chloro - Δ¹,⁴ - pregnadiene - 17α - ol - 3,11,20-trione, Compound XLII, and 12α-fluoro-Δ¹,⁴-pregnadiene-17α-ol-3,11,20-trione, Compound XLIII).

Compounds Hf and Hg, containing a 21-acyloxy radical can be hydrolyzed in the usual manner, as by the use of a salt of a strong base and a weak acid (e.g., potassium carbonate) to yield the free 21-hydroxyl derivative (e.g., 12α-chlorocortisone, 12α-fluorocortisone, 12α - chloro - Δ¹,⁴ - pregnadiene - 17α,21 - diol - 3,11,20-trione and 12α-fluoro-Δ¹,⁴-pregnadiene-17α,21-diol-3,11,20-trione).

Compounds He, Hf, and Hg can further be converted to the corresponding 11β-hydroxy derivatives by either of two processes. In the first process, the steroid is treated with semicarbazide in a lower alcohol to yield the 3,20-disemicarbazone, Compounds Hh, which are then treated with an alkali metal boron or lithium tetrahydride (e.g., potassium boron tetrahydride) in an organic solvent inert towards the tetrahydride (either in the presence or absence of water) to yield the corresponding 11β-hydroxy derivative, Compounds Hi, and the resultant steroids are then reacted with nitrous acid in a dilute mineral acid (e.g., hydrochloric acid) to yield Compounds H, having an 11β-hydroxy radical, the 12α-halo radical of the starting steroid and keto groups in the 3,20-positions (e.g., 12α-chlorohydrocortisone, 12α-fluorohydrocortisone, 12α - chloro - 11β,17α - dihydroxy-progesterone, 12α - fluoro - 11β,17α - dihydroxy - progesterone, 12α - chloro - Δ¹,⁴ - pregnadiene - 11β,17α,21-triol - 3,20 - dione, 12α - fluoro - Δ¹,⁴ - pregnadiene-11β,17α,21 - triol - 3,20 - dione, 12α - chloro - Δ¹,⁴-pregnadiene - 11β,17α - diol - 3,20 - dione, 12α - fluoro-Δ¹,⁴ - pregnadiene - 11β,17α - diol - 3,20 - dione, 12α-chloro - allopregnane - 11β,17α,21 - triol - 3,20 - dione, 12α - chloro - allopregnane - 11β,17α,21 - triol - 3,20-dione, 12α-chloro-allopregnane-11β,17α-diol-3,20-dione and 12α-fluoro-allopregnane-11β,17α-diol-3,20-dione).

In the second process, Compounds Hf or Hg are first hydrolyzed and then ketalized by treatment with a 1,2- glycol (e.g., ethylene glycol) in an inert solvent in the presence of an acid catalyst, to form the corresponding 3,20-diketal derivatives, Compounds Hj, which are then reduced with an alkali metal boron or lithium tetrahydride, as described hereinbefore, to yield the 11β-hydroxy 3,20-diketal derivative, Compounds Hk. The latter are then either treated with a dilute acid, such as sulfuric acid in methanol, to yield a 12α-halo-11β-hydroxy-3,20-diketo steroid wherein the halo group is that of the starting steroid, or dehydrochlorinated (when the 12α-halo substituent is chlorine) to the corresponding 11β, 12β- epoxide, Compounds Ka, by treatment with a salt of a strong base and a weak acid (e.g., potassium carbonate). The resultant epoxide ketalized in the 3,20-positions, is then hydrolyzed with diluted acid (e.g., sulfuric acid) to yield the corresponding 11β,12β-epoxy-3,20-diketo derivative, Compounds Kb, which can then be treated with a hydrohalic acid (e.g., hydrofluoric, hydrochloric, hydrobromic, or hydroiodic acid), preferably after esterifying any free 21-hydroxyl radical present, to yield the respective 12α-halo-11β-hydroxy derivative. The resultant 12α-halo-11β-hydroxy steroid, can, if desired, be oxidized with chromic acid to its 12α-halo-11-keto derivative, thereby affording a generalized method for producing any 12α-halo-11-keto derivative.

The following examples are illustrative of the invention (all temperatures being in centigrade):

EXAMPLE 1

*12α-fluoro-5α,22a-spirostane-3β,11β-diol 3-acetate (I) and 9α-fluoro-5α,22a-spirostane-3β,12β-diol 3-acetate*

Into a solution of 2 g. of 11β,12β-epoxy-5α,22a-spirostane-3β-ol 3-acetate in 76 ml. of chloroform and 4 ml. of absolute alcohol is passed with stirring at 0° a stream of hydrogen fluoride. After 10 minutes two layers form and the addition of hydrogen fluoride is terminated. After 75 minutes at 0°, the reaction mixture is neutralized with a suspension of sodium bicarbonate in water and the layers separated. The chloroform is washed with water, dried over sodium sulfate and evaporated to dryness in vacuo. The crystalline residue upon one crystallization from chloroform-alcohol furnishes pure 9α - fluoro - 5α,22a-spirostane - 3β,12β - diol 3 - acetate having the following properties: M.P. about 251–252°; $[\alpha]_D^{23}$ —70° (c. 0.96 in chloroform)

$\lambda_{max.}^{Nujol}$ 2.69 μ, 5.76 μ

*Analysis.*—Calc. for $C_{29}H_{45}O_5F$ (492.65): C, 70.69; H, 9.21; F, 3.85. Found: C, 70.66; H, 9.02; F, 3.91.

The 12β-acetate of 9α-fluoro-5α,22a-spirostane-3β,12β-diol 3-acetate can be prepared by allowing a solution of 25 mg. of the compound in 0.5 ml. of pyridine and 0.5 ml. of acetic anhydride to remain at room temperature for 18 hours, and removing the reagents to yield a crystalline residue consisting of the 12β-acetate, which after recrystallization from 95% ethanol has the following properties: M.P. about 257–258°; $[\alpha]_D^{24}$ —75° (c. 0.98 in chloroform);

$\lambda_{max.}^{Nujol}$ 5.77 μ

*Analysis.*—Calc. for $C_{31}H_{42}O_6F$ (534.66): C, 69.64; H, 8.86. Found: C, 69.76; H, 8.61.

The mother liquors of the above reaction with hydrogen fluoride are combined and dissolved in 10 ml. of benzene and 20 ml. of hexane. After centrifuging off a small flocculent precipitate, the resulting solution is chromatographed on 15 g. of sulfuric acid-washed alumina. Elution of the column with 700 ml. of a mixture of one part of benzene and two parts of hexane furnishes after recrystallization from 95% ethanol, pure 12α-fluoro-5α,22a-spirostane-3β,11β-diol 3-acetate having the following properties: M.P. about 239–241°; $[\alpha]_D^{23}$ —44° (c. 0.65 in chloroform);

$\lambda_{max.}^{Nujol}$ 2.86 μ, 5.82 μ

*Analysis.*—Calc. for $C_{29}H_{45}O_5F$ (492.65): C, 70.69; H, 9.21. Found: C, 70.67; H, 9.11.

EXAMPLE 2

*12α-chloro-5α,22a-spirostane-3β-ol-11-one 3-acetate (III)*

A solution of 3.43 g. of 3β-acetoxy-12α-chloro-5α,22a-spirostane-11β-ol (II) (see J. Schmidlin and A. Wettstein, Helv. 36, 1241 (1953) in 340 ml. of reagent grade acetone is oxidized dropwise, with stirring at room temperature with 4.1 ml. of $CrO_3$ solution (excess, calc. amount 2.4 ml. solution containing 200 mg. $CrO_3$ and 320 mg. conc. $H_2SO_4$ in 1 ml. water). The excess $CrO_3$ is destroyed by addition of 1 ml. of ethanol and after addition of 100 ml. of water, the solution is decanted from remaining salts, concentrated in vacuo until most of the acetone is removed and the resulting crystals filtered off. Yield about 2.87 g. (84%), M.P. about 173–176°. The analytical sample is recrystallized several times from ethanol and has the following properties: M.P. about 183–185°, $[\alpha]_D$ —80° (c. 0.44 in chloroform), $\lambda_{max.}^{Nujol}$ 5.76 μ, 5.78 μ (doublet), 5.85 μ

*Analysis.*—Calcd. for $C_{29}H_{41}O_5Cl$ (505.08): C, 68.96; H, 8.18; Cl, 7.02. Found: C, 68.49; H, 8.20; Cl, 6.18.

EXAMPLE 3

*12α-fluoro-5α,22a-spirostane-3β-ol-11-one 3-acetate (IV)*

To a solution of 60 mg. of 12α-fluoro-5α,22a-spirostane-3β,11β-diol 3-acetate (I) in 6 ml. of reagent grade acetone is added at room temperature 0.08 ml. of a solution of chromic acid (200 mg.) and sulfuric acid (320 mg.) in water (1 ml.). After ½ hour 0.25 ml. of alcohol and 5 minutes later 5 ml. of water is added and the acetone removed in vacuo. The residue is taken up in chloroform and the resulting $CHCl_3$-extract washed with water, dilute bicarbonate and again with water. Removal of the solvent from the sodium sulfate-dried extract furnishes the crude 11-ketone, which after crystallization from 95% alcohol has the following properties: M.P. about 203–204°; $[\alpha]_D^{23}$ —6° (c. 1.28 in $CHCl_3$);

$\lambda_{max.}^{Nujol}$ 5.79 μ, 5.82 μ (shoulder)

*Analysis.*—Calcd. for $C_{29}H_{43}O_5F$ (490.63): C, 70.99; H, 8.83. Found: C, 71.13; H, 8.66.

EXAMPLE 4

*12α-chloro-$\Delta^{20(22)}$-furostene-3β,26-diol-11-one 3,26-diacetate (V)*

A solution of 4.45 g. of the 12α-chloro-11-ketospirostane (III) prepared in Example 2 and 2 g. of pyridine hydrochloride in 23 ml. of acetic anhydride is refluxed under exclusion of moisture for 5 hours. The mixture is then cooled in an icebath and the acetic anhydride destroyed by careful addition of ice. The mixture is extracted with ethyl acetate, the ethyl acetate extract washed free of acetic acid and pyridine, dried over sodium sulfate and evaporated in vacuo. A yield of about 4.84 g. of the crude furostene diacetate (V) is obtained. Several recrystallizations from ethyl acetate yield the analytical sample, M.P. about 118–119°; $[\alpha]_D^{23}$ +7° (c. 0.4 in chloroform);

$\lambda_{max.}^{Nujol}$ 5.76 μ, 5.84 μ

*Analysis.*—Calcd. for $C_{31}H_{45}O_6Cl$ (549.13): C, 67.80; H, 8.26; Cl, 6.46. Found: C, 67.88; H, 8.09; Cl, 6.10.

Similarly, by substituting 12α-fluoro-5α,22a-spirostane-3β-ol-11-one 3-acetate (IV) for the 12α-chlorospirostane in the procedure of Example 4, 12α-fluoro-$\Delta^{20(22)}$-furostene-3β,26-diol-11-one 3,26-diacetate (VI) is produced.

EXAMPLE 5

*12α - chloro - allopregnane - 3β,16β - diol - 11,20 - dione 3-acetate, 16-(4-methyl-5-acetoxy)pentanoate (VII)*

(a) *Oxidation with peracetic acid.* A solution of 4.02 g. of the crude, noncrystalline furostene diacetate (V) in 52.5 ml. of glacial acetic acid and 31.5 ml. of 30%

H₂O₂ is allowed to stand at room temperature for 5 hours. 6 ml. of water is then added dropwise with stirring and the crystals filtered off, washed with 50% acetic acid and water. About 1.93 g. of VII is obtained (M.P. about 190–195°) which after recrystallization from acetone-hexane has the following properties: M.P. about 191–193°; $[\alpha]_D^{23}$ —31° (c. 0.45 in chloroform);

$\lambda_{max.}^{EtOH}$ no specific UV absorption; $\lambda_{max.}^{Nujol}$ 5.75 μ, 5.80 μ, 5.85 μ

*Analysis.*—Calcd. for $C_{31}H_{45}O_8Cl$ (581.13): C, 63.92; H, 7.81. Found: C, 63.56; H, 7.57.

(b) *By oxidation with chromic acid*: To a solution of 100 mg. of the spirostane diacetate (V) in a mixture of 2 ml. of ethylene dichloride, 2 ml. of glacial acetic acid and 0.4 ml. of water is added with stirring at 10° over a 30-minute period 2 ml. of a solution of chromic acid in acetic acid (25 mg./ml.). The reaction mixture is allowed to warm up to and remain at room temperature for an additional two hours. Excess chromium trioxide is destroyed by the addition of 0.5 ml. of alcohol and the reaction mixture concentrated in vacuo. The residue is distributed between chloroform and water and the chloroform solution washed with water, sodium bicarbonate and again with water. Evaporation of the sodium sulfate-dried extract to dryness furnishes a crystalline residue, which after recrystallization from alcohol affords about 50 mg. of the allopregnane derivative VII, M.P. about 188–190°.

Similarly, by substituting 12α-fluoro-Δ²⁰⁽²²⁾-furostene-3β,26-diol-11-one, 3,26-diacetate (VI) for the 12α-chloro-furostene, 12α-fluoro-allopregnane-3β,16β-diol-11,20-dione 3-acetate-16-(4-methyl-5-acetoxy)-pentanoate (VIII) is formed.

EXAMPLE 6

*12α-chloro-Δ¹⁶-allopregnene-3β-ol-11,20-dione 3-acetate (IX)*

To a solution of the allopregnane derivative (VII) in 4 ml. of tertiary butanol is added a solution of 200 mg. of KOH in 0.3 ml. of water. The mixture is allowed to remain at room temperature for 1.5 hours and then neutralized with dilute hydrochloric acid. Water is added and the mixture extracted with ether. The ether extract is dried over sodium sulfate and the solvent removed in vacuo. The residue is reacetylated with 1 ml. of pyridine and 1 ml. acetic anhydride for 18 hours and after removal of the reagents in vacuo dissolved in 5 ml. of benzene and 5 ml. of hexane for chromatography on 3 g. of sulfuric-acid washed alumina. Elution of the column with benzene-hexane 1:1 furnishes in the first 200 ml. the desired Δ¹⁶-allopregnene derivative (IX), which after crystallization from ether hexane has the following properties: M.P. about 202–204; $[\alpha]_D^{23}$ +3° (c. 0.32 in chloroform)

$\lambda_{max.}^{EtOH}$ 229 mμ (ε=11,000), $\lambda_{max.}^{Nujol}$ 5.76 μ, 5.85 μ, 6.03 μ, 6.29 μ.

*Analysis.*—Calcd. for $C_{23}H_{31}O_4Cl$ (406.94): C, 67.88; H, 7.68. Found: C, 67.77; H, 7.60.

In the same manner, by substituting 12α-fluoro-allopregnane-3β,16β-diol-11,20-dione 3-acetate-16-(4-methyl-5-acetoxy) pentanoate (VIII) for the chloro compound in the procedure of Example 6, 12α-fluoro-Δ¹⁶-allopregnene-3β-ol-11,20-dione 3-acetate (X) is formed.

EXAMPLE 7

*12α-chloro-allopregnane-16α,17α-oxido-3β-ol-11,20-dione 3-acetate (XI)*

To a solution of 100 mg. of 12α-chloro-Δ¹⁶-allopregnene-3β-ol-11,20-dione 3-acetate (IX) in 8 ml. of cold methanol, 0.9 ml. of cold 30% H₂O₂ and 0.37 ml. of 4 N NaOH is added. The mixture is allowed to remain at 0° for 6 hours and then diluted with water and neutralized with dilute hydrochloric acid. Chloroform is added and the resulting chloroform extract is washed with water, dried over sodium sulfate and evaporated to dryness in vacuo. The resulting residue is acetylated with 1 ml. of acetic anhydride and 1 ml. of pyridine for 15 hours and after removal of the reagents in vacuo, recrystallized from 95% alcohol. The resulting 16,17-epoxide has the properties described in the following Example 8.

Similarly, by substituting 12α-fluoro-Δ¹⁶-allopregnene-3β-ol-11,20-dione 3-acetate (X) for the chloro steroid of Example 7, 12α-fluoro-allopregnane-16α,17α-oxido-3β-ol-11,20-dione 3-acetate (XII) is formed.

Compounds XI and XII can also be prepared directly from Compounds VII and VIII, respectively, as illustrated by the following example.

EXAMPLE 8

1.93 g. of VII is suspended in 157 ml. of cold methanol and 17.3 ml. of cold 30% H₂O₂ and 7.8 ml. of cold 4 N NaOH are added. The mixture is stirred with cooling in an icebath for 6 hours, then about 50 ml. water is slowly added and the mixture filtered quickly, and washed with dilute acetic acid and water until neutral. The crude epoxide (XI) melts at about 272–275° (yield approximately 847 mg.). The mother liquor is extracted with chloroform, the chloroform extract washed free of hydrogen peroxide and acetic acid with sodium bicarbonate solution and water, dried over sodium sulfate and evaporated to dryness in vacuo. The residue after reacetylation with 2 ml. of pyridine and 2 ml. of acetic anhydride furnishes an additional 330 mg. of XI after crystallization of the crude acetylation residue from ethanol.

The analytical sample obtained by recrystallization from 95% alcohol has the following properties: M.P. about 278–80°, $[\alpha]_D^{23}$ —6° (c. 0.21 in chloroform), $\lambda_{max.}^{Nujol}$ 5.80 μ, 5.87 μ

*Analysis.*—Calcd. for $C_{23}H_{31}O_5Cl$ (422.94): C, 65.31; H, 7.39. Found: C, 65.30; H, 7.44.

EXAMPLE 9

*12α-chloro-16β-bromo-allopregnane-3β,17α-diol-11,20-dione 3-acetate (XIII)*

To a solution of 90 mg. of the 16α,17α-epoxide (XI) in 3 ml. of glacial acetic acid is added 1 ml. of 7% HBr in acetic acid (1 part of 48% aqueous HBr plus 6 parts of glacial acetic acid. The reaction mixture is allowed to stand at room temperature over night, poured on ice and extracted with chloroform. The chloroform extract is washed with water, sodium bicarbonate and again with water, dried over sodium sulfate and evaporated to dryness in vacuo. The residue (about 103 mg.) after recrystallization from acetone-hexane furnishes the pure bromohydrin of the following properties: M.P. about 219–220°, $[\alpha]_D^{23}$ —37° (c, 0.4 in chloroform);

$\lambda_{max.}^{Nujol}$ 2.86 μ, 5.79 μ, 5.85 μ

*Analysis.*—Calcd. for $C_{23}H_{32}O_5ClBr$ (503.87): C, 54.82; H, 6.40. Found: C, 54.22; H, 6.27.

EXAMPLE 10

*12α-chloro-16β-iodo-allopregnane-3β,17α-diol-11,20-dione 3-acetate (XIV)*

To a solution of 400 mg. of 12α-chloro-16α,17α-epoxy-allopregnane-3β-ol-11,20-dione 3-acetate (XI) in 20 ml. of glacial acetic acid is added under a carbon dioxide blanket 3 ml. of redistilled iodine-free 57% hydriodic acid. The mixture is allowed to stand in the dark for 40 hours, diluted with water and extracted with chloroform. The chloroform extract is washed with water, sodium bicarbonate solution and again with water containing a small amount of sodium sulfite. The chloroform solution is dried over sodium sulfate and evaporated to dryness in vacuo. The residue (about 547 mg.) crystallizes readily from 95% alcohol and is used in the next step without further purification. An analytical sample after recrystallization from alcohol has the following properties: M.P. about 188–190° (dec.), $[\alpha]_D^{23}$ —14° (c. 0.66 in chloroform);

$\lambda_{max.}^{Nujol}$ 2.75 μ, 5.78 μ, 5.85 μ

Analysis.—Calcd. for $C_{23}H_{32}O_5Cl$ (552.8): C, 49.96; H, 6.19. Found: C, 50.27; H, 6.11.

Similarly, by substituting 12α-fluoro-allopregnane-16α,17α-oxido-3β-ol-11,20-dione 3-acetate (XII) for the 12α-chloro compound of Example 10, 12α-fluoro-16β-iodo-allopregnane-3β,17α-diol-11,20-dione 3-acetate (XV) is prepared.

EXAMPLE 11

*12α-chloro-allopregnane-3β,17α-diol-11,20-dione 3-acetate (XVI)*

To a solution of 1.0 g. of the 12α-chloro-16β-iodide (XIV) in 50 ml. of peroxide free dioxane is added 8 ml. of neutral Raney nickel (commercial, pyrophoric) suspended in 10 ml. of dioxane and the resulting suspension shaken in the dark at room temperature for 1 hour. The catalyst is centrifuged off and the solution is diluted with water and chloroform. The chloroform-dioxane phase is separated off, dried over sodium sulfate and the solvents evaporated in vacuo. The crystalline residue after recrystallization from 95% alcohol furnishes pure 12α-chloroallopregnane-3β,17α-diol-11,20-dione 3-acetate of the following properties: M.P. about 222–224°; $[\alpha]_D^{23}$ —35° (c. 0.42 in chloroform);

$\lambda_{max.}^{Nujol}$ 2.87 μ, 5.79 μ, 5.82 μ (shoulder), 5.87 μ

Analysis.—Calcd. for $C_{23}H_{33}O_5Cl$ (424.96): C, 65.16; H, 7.83. Found: C, 64.71; H, 7.44.

Similarly, by substituting 12α-fluoro-16β-iodoallopregnane-3β,17α-diol-11,20-dione 3-acetate (XV) or 12α-chloro - 16β - bromo - allopregnane - 3β,17α - diol-11,20-dione 3-acetate (XIII) for the 12α-chloro-16α-iodo-steroid of Example 11, 12α-fluoro-allopregnane-3β,17α-diol-11,20-dione 3-acetate (XVII) and Compound XVI are formed, respectively.

EXAMPLE 12

*12α-chloro-allopregnane-3β,17α-diol-11,20-dione (XVIII)*

A solution of 610 mg. of 12α-chloroallopregnane-3β,17α-diol-11,20-dione 3-acetate (XVI) in 60 ml. of methanol and 0.6 ml. of 70% perchloric acid is refluxed for 2 hours. The solution is then neutralized with sodium bicarbonate solution, diluted with water and the methanol removed in vacuo. Chloroform is added and the resulting extract washed with bicarbonate solution and with water. The dried extract after evaporation of the solvent in vacuo furnishes 12α-chloroallopregnane-3β,17α-diol-11,20-dione (XVIII), which after recrystallization from 95% alcohol has the following properties: M.P. about 221–222°, $[\alpha]_D^{23}$ —34°;

$\lambda_{max.}^{Nujol}$ 2.96 μ, 3.05 μ (shoulder), 5.82 μ, 5.92 μ

Analysis.—Calcd. for $C_{21}H_{31}O_4Cl$ (382.92): C, 65.86; H, 8.16. Found: C, 65.99; H, 8.26.

Similarly, 12α - fluoro - allopregnane - 3β,17α - diol-11,20-dione 3-acetate can be hydrolyzed to the free 3-hydroxyl compound (XIX).

The preparation of the 21-oxy steroids of this invention is illustrated by the following three examples:

EXAMPLE 13

*12α-chloro-21-bromo-allopregnane-3β,17α-diol-11,20-dione (XX)*

To a solution of 150 mg. of 12α-chloroallopregnane-3β,17α-diol-11,20-dione (XVIII) in 9 ml. of chloroform is added at room temperature with stirring 1.60 ml. of a solution of bromine in chloroform (43.2 mg./ml.). To initiate the reaction a drop of 10% HBr in acetic acid is added. A total reaction time of 8 minutes is required. At the end of that period water is added and the chloroform solution washed neutral with sodium bicarbonate. After drying over sodium sulfate the solvent is removed in vacuo and the residual bromo compound crystallized from acetone-hexane. Pure 12α-chloro-21-bromoallopregnane-3β,17α-diol-11,20-dione has the following properties: M.P. about 195–196° (dec.); $[\alpha]_D^{23}$ —37° (c. 0.68 in $CHCl_3$);

$\lambda_{max.}^{Nujol}$ 2.85 μ, 3.06 μ, 5.83 μ

Analysis.—Calcd. for $C_{21}H_{30}O_4ClBr$ (461.81): C, 54.61; H, 6.54. Found: C, 55.68; H, 6.72.

Similarly 12α - fluoro - allopregnane - 3β,17α - diol-11,20-dione can be brominated to 12α-fluoro-21-bromoallopregnane-3β,17α-diol-11,20-dione (XXI).

EXAMPLE 14

*12α-chloro-allopregnane-3β,17α,21-triol-11,20-dione 21-acetate (XXII)*

To a solution of 252 mg. of 12α-chloro-21-bromoallopregnane-3β,17α-diol-11,20-dione (XX) in 16 ml. of acetone is added in the order given 0.35 ml. of glacial acetic acid, 558 mg. of potassium bicarbonate and 19 mg. of sodium iodide. The resulting mixture is refluxed with stirring for 17 hours, after which period water is added and the acetone removed in vacuo. Ethyl acetate is then added to the aqueous suspension and the layers separated and the ethyl acetate solution washed with sodium bicarbonate and with water. The sodium sulfate-dried ethyl acetate extract is concentrated to dryness in vacuo and the resulting crystalline residue recrystallized from 95% alcohol. The pure compound has the following properties: M.P. about 158–160°; $[\alpha]_D^{23}$ —17° (c. 0.75 in $CHCl_3$);

$\lambda_{max.}^{Nujol}$ 2.85 μ, 3.00 μ, 5.75 μ (shoulder), 5.82 μ

Analysis.—Calcd. for $C_{23}H_{33}O_6Cl$ (440.94): C, 62.64; H, 7.54. Found: C, 62.45, H, 8.02.

Similarly 12α - fluoro - 21 - bromo - allopregnane-3β,17α-diol-11,20-dione yields 12α-fluoro-allopregnane-3β,17α,21-triol-11,20-dione 21-acetate (XXIII).

EXAMPLE 15

*12α - chloro - allopregnane-17α,21-diol-3,11,20-trione 21-acetate (XXIV)*

To a solution of 236 mg. of 12α-chloroallopregnane-3β,17α,21-triol-11,20-dione 21-acetate (XXII) in 24 ml. of reagent grade acetone is added dropwise with stirring at room temperature 0.67 ml. of a solution of 188 mg. of $CrO_3$ and 175 mg. of sulfuric acid in 1 ml. of water. After a total reaction time of 25 minutes the excess $CrO_3$ is reduced with 0.5 ml. of alcohol and water is added. After removal of the acetone in vacuo chloroform is added, the resulting chloroform extract washed with water, sodium bicarbonate solution, and again with water. The solution is then dried over sodium sulfate and concentrated to dryness in vacuo. Pure 12α-chloroallopregnane-17α,21-diol-3,11,20-trione 21-acetate after recrystallization from acetone-hexane has the following properties: M.P. about 214–216°; $[\alpha]_D^{23}$ +4° (c. 0.83 in $CHCl_3$);

$\lambda_{max.}^{Nujol}$ 2.93 μ, 5.74 μ, 5.82 μ, 5.88 μ

Analysis.—Calcd. for $C_{23}H_{31}O_6Cl$ (438.92): C, 62.93; H, 7.11. Found: C, 63.25; H, 7.31.

Similarly 12α-fluoro-allopregnane-3β,17α,21-triol-11,20-dione 21-acetate can be oxidized to 12α-fluoro-allopregnane-17α,21-diol-3,11,20-trione 21-acetate (XXV).

EXAMPLE 16

*12α-chloro-allopregnane-17α-ol-3,11,20-trione (XXVI)*

A solution of 500 mg. of 12α-chloroallopregnane-3β,17α-diol-11,20-dione (XLIII) in 50 ml. of reagent grade acetone is treated dropwise with stirring with 1.4 ml. of a solution of 188 mg. of $CrO_3$ and 300 mg. of sulfuric acid in 1 ml. of water. After a total reaction time of 40 minutes, 0.5 ml. of alcohol is added and then 20 ml. of water. After removal of the acetone in vacuo the resulting mixture is extracted with chloroform, the chloroform extract washed with water, dilute sodium bicarbonate and again with water, dried over sodium sulfate and evaporated to dryness in vacuo. The residue upon crystallization from alcohol furnishes pure 12α-chloroallopregnane-17α-ol-3,11,20-trione (XXVI).

Similarly 12α-fluoro-allopregnane-3β,17α-diol-11,20-dione (XIX) can be oxidized to 12α-fluoro-allopregnane-17α-ol-3,11,20-trione (XXVII).

EXAMPLE 17

*12α - chloro - 2α,4α - dibromo - allopregnane - 17α,21-diol-3,11,20-trione 21-acetate (XXVIII)*

To a solution of 200 mg. of 12α-chloroallopregnane-17α,21-diol-3,11,20-trione 21-acetate (XXIV) in 13 ml. of glacial acetic acid is added at room temperature with stirring 3.35 ml. of a solution of bromine in glacial acetic acid (45.4 mg./ml.). To initiate reaction a few drops of 10% hydrogen bromide in acetic acid are added. Bromination is complete after 3 hours. The mixture is taken up in chloroform and water and the resulting chloroform extract washed with sodium bicarbonate solution and water, dried over sodium sulfate and evaporated to dryness in vacuo. The residue crystallizes readily from acetone-hexane and furnishes the pure dibromide having the following properties; M.P. about 179–181° (dec.); $[\alpha]_D^{24}$ +1.5° (c. 1.26 in $CHCl_3$).

Similarly 12α-fluoro-allopregnane-17α,21-diol-3,11,20-trione 21-acetate (XXV), 12α-chloro-allopregnane-17α-ol-3,11,20-trione (XXVI) and 12α-fluoro-allopregnane-17α-ol-3,11,20-trione (XXVII) can be dibrominated to the respective 2α,4α-dibromo derivatives (Compounds XXIX, XXX, and XXXI).

EXAMPLE 18

*12α-chloro-2α-iodocortisone 21-acetate (XXXII)*

A solution of 90 mg. of the dibromide (XXVIII) prepared by the procedure of Example 17 and 240 mg. of sodium iodide in 5 ml. of acetone is refluxed for 18.5 hours. The reaction mixture is diluted with water and the acetone removed in vacuo. The resulting suspension is extracted with chloroform and the chloroform solution washed with water containing a trace of sodium sulfite. Evaporation of the sodium sulfate-dried chloroform extract in vacuo leaves the 2-iodide as a crystalline residue, which after recrystallization from acetone-hexane melts at about 166–167° (dec.);

$\lambda_{max}^{alc.}$ 240 mμ (ε=14,000)

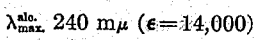

The iodide is used in the reaction of Example 19 without recrystallization.

Similarly, 12α-fluoro-2α,4α-dibromo-allopregnane-17α,21-diol-3,11,20-trione 21-acetate (XXIX), 12α-chloro-2α,4α-dibromo-allopregnane-17α-ol-3,11,20-trione (XXX), and 12α-fluoro-2α,4α-dibromo-allopregnane-17α-ol-3,11,20-trione (XXXI) can be converted to 12α-fluoro-2α-iodocortisone 21-acetate (XXXIII), 12α-chloro-2α-iodo-17α-hydroxy-11-ketoprogesterone (XXXIV), and 12α-fluoro - 2α - iodo - 17α - hydroxy - 11 - keto-progesterone (XXXV), respectively.

EXAMPLE 19

*12α-chlorocortisone 21-acetate (XXXVI)*

To a solution of 50 mg. of the 12α-chloro-2α-iodide (XXXII) of Example 18 in 3 ml. of acetone is added under nitrogen 0.6 ml. of an aqueous chromous chloride solution (prepared from 5 g. of chromic chloride in 20 ml. of water). The mixture is allowed to remain at room temperature for 10 minutes, after which time water and chloroform are added. The resulting chloroform extract is washed with water, dilute sodium bicarbonate and again with water, dried over sodium sulfate and evaporated to dryness in vacuo. The residual material crystallizes readily and furnishes pure 12α-chlorocortisone acetate upon recrystallization from 95% alcohol, M.P. about 185°;

$\lambda_{max}^{alc.}$ 236 mμ (ε=14,000)

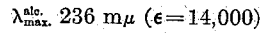

The material obtained in this fashion contains some 12α-chloroallopregnane-17α,21-diol-3,11,20-trione 21-acetate as shown by the low extinction coefficient. It is therefore purified by chromatography on acid-washed alumina (1 g.) in the following manner: the substance is dissolved in 3 ml. of benzene and 3 ml. of hexane, poured on the column and eluted at first with benzene (300 ml.) to remove contaminants. Subsequent elution with benzene containing 5% of chloroform yields pure 12α-chlorocortisone acetate of the following properties: M.P. about 195–196°; $[\alpha]_D^{23}$ +82° (c. 1.03 in $CHCl_3$);

$\lambda_{max}^{alc.}$ 236 mμ (ε=16,800); $\lambda_{max}^{Nujol}$ 2.84 μ, 2.96–3.00 μ, 5.72 μ 5.79 μ, 5.88 μ, 6.02 μ, 6.20 μ)

*Analysis.*—Calcd. for $C_{23}H_{29}O_6Cl$ (436.91): C, 63.22; H, 6.69; Cl, 8.11. Found: C, 63.18; H, 6.84; Cl, 8.06.

Similarly, 12α-fluoro-2α-iodocortisone 21-acetate, 12α-chloro-2α-iodo-17α-hydroxy-11-ketoprogesterone and 12α-fluoro-2α-iodo-17α-hydroxy-11-ketoprogesterone can be deiodinated to yield 12α-fluorocortisone 21-acetate (XXVII), 12α - chloro-17α-hydroxy-11-ketoprogesterone (XXXVIII) and 12α-fluoro-17α-hydroxy-11-ketoprogesterone (XXXIX), respectively.

EXAMPLE 20

*12α-chlorocortisone (XLIV)*

To a solution of 50 mg. of 12α-chlorocortisone acetate (XXXVI) in 3 ml. of methanol is added under nitrogen 0.6 ml. of oxygen free 10% aqueous potassium carbonate. After 30 minutes at room temperature the solution is neutralized with glacial acetic acid and diluted with 3 ml. of water. Crystallization ensued which becomes complete after removal of the methanol in vacuo. The crystals are collected on a filter, washed with water, dried and recrystallized from 95% alcohol.

Similarly, 12α-fluorocortisone 21-acetate can be hydrolyzed to 12α-fluorocortisone.

EXAMPLE 21

*12α-chloro-Δ$^{1,4}$-pregnadiene-17α,21-diol-3,11,20-trione 21-acetate (XL)*

A solution of 500 mg. of 12α-chloro-2α,4α-dibromo-allopregnane-17α,21-diol-3,11,20-trione (XXVIII) in 5 ml. of collidine is refluxed for 45 minutes and the resulting mixture diluted with chloroform and dilute hydrochloric acid. The resulting chloroform extract is extracted with hydrochloric acid until free of collidine and finally with water. The sodium sulfate dried extract is evaporated in vacuo, dissolved in 2 ml. of chloroform and 8 ml. of benzene and the resulting solution chromatographed on 8 grams of sulfuric acid-washed alumina. The column is first eluted with benzene-chloroform 1:1 (400 ml.) to remove impurities, and then with chloroform (400 ml.). The latter solvent elutes the desired 1-dehydro-12α-chlorocortisone acetate (XL), which is obtained in pure form by crystallization from 95% alcohol.

Similarly, 12α - fluoro-2α,4α-dibromo-allopregnane-17α, 21-diol-3,11,20-trione 21-acetate (XXIX), 12α-chloro-2α, 4α-dibromo-allopregnane - 17α-ol-3,11,20 - trione (XXX) and 12α-fluoro-2α,4α - dibromo-allopregnane-17α-ol-3,11, 20-trione (XXXI) can be converted to 12α-fluoro-Δ$^{1,4}$-pregnadiene-17α,21 - diol - 3,11,20 - trione 21-acetate (XLI), 12α-chloro-Δ$^{1,4}$-pregnadiene-17α-ol-3,11,20 - trione (XLII), and 12α-fluoro-Δ$^{1,4}$-pregnadiene - 17α-ol-3,11,20-trione (XLIII), respectively.

Compounds XL and XLI can then be hydrolyzed to the free 21-hydroxy steroid by the method of Example 20.

The following examples illustrate one of the processes for converting the 11-keto steroids to their 11β-hydroxy derivatives.

EXAMPLE 22

*3,20-diethylene ketal of 12α-chlorocortisone (XLV)*

A mixture of 200 mg. of 12α-chlorocortisone (XLIV), 4 ml. of ethylene glycol, 18 ml. of benzene and 15 mg. of p-toluenesulfonic acid monohydrate is refluxed for 5 hours with the aid of a Dean-Stark water separator. After cooling of the reaction mixture, dilute sodium bicarbonate solution is added and the layers are separated. The aqueous phase is extracted with chloroform, the organic phases combined, washed with water, dried over sodium sulfate and evaporated to dryness in vacuo. The residue representing 3,20-diethylene ketal of 12α-chlorocortisone is used in the subsequent reaction of Example 23 without further purification.

EXAMPLE 23

*3,20-diethylene ketal of 12α-chlorohydrocortisone (XLVI)*

A solution of 200 mg. of the diketal (XLV) prepared in Example 22 and 100 mg. of potassium borohydride in 10 ml. of tetrahydrofuran and 5 ml. of water is allowed to react at room temperature for 30 minutes and then at reflux for an additional 6 hours. After cooling, the mixture is concentrated in vacuo to remove the bulk of the tetrahydrofuran and the resulting suspension extracted with chloroform. The chloroform extract is washed with water, dried over sodium sulfate and the solvent removed in vacuo. Crystallization of the residue from acetone-hexane yields the 3,20-diketal of 12α-chlorohydrocortisone (XLVI) in pure form.

EXAMPLE 24

*12α-chlorohydrocortisone (XLIX)*

A solution of 100 mg. of 12α-hydrocortisone-3,20-diethylene ketal (XLVI) in 15 ml. of methanol and 1.5 ml. of 3 N sulfuric acid is refluxed for 40 minutes. After cooling, water is added, the mixture concentrated in vacuo to remove the bulk of the methanol and the resulting suspension extracted with ethyl acetate. The ethyl acetate extract is washed with dilute sodium bicarbonate and water, dried over sodium sulfate and evaporated to dryness in vacuo. The crystalline residue is recrystallized from 95% alcohol and furnishes the pure 12α-chlorohydrocortisone (XLIX).

EXAMPLE 25

*Δ⁴-pregnene-11β,12β-oxido-17α,21-diol-3,20-dione (XLVII)*

A solution of 400 mg. of the 3,20-ethylene ketal of 12α-chlorohydrocortisone (XLVI) in 10 ml. of methanol and 2 ml. of 10% potassium carbonate in water is refluxed for one hour. The mixture is then neutralized with 3 N aqueous sulfuric acid and when neutral treated with 1.5 ml. of sulfuric acid of the same strength. After 4 hours at room temperature, chloroform is added and the resulting chloroform extract is washed with dilute sodium bicarbonate and water. Removal of the solvent leaves the 11β,12β-oxide (XLVII) as a crystalline residue, which is recrystallized from 95% alcohol.

The 11β,12β-oxide (XLVII) is acetylated with pyridine-acetic anhydride to form Δ⁴-pregnene-11β,12β-oxido-17α, 21-diol-3,20-dione 21-acetate (XLVIII).

EXAMPLE 26

*12α-bromohydrocortisone acetate (L)*

To a solution of 100 mg. of Δ⁴-pregnene-11β,12β-oxido-17α,21-diol-3,20-dione 21-acetate (XLVIII) in 5 ml. of dioxane is added at 0° 0.3 ml. of 48% HBr. The mixture is allowed to remain at 0° for one hour and is then diluted with chloroform and water. The chloroform extract is washed with dilute sodium bicarbonate and water, dried over sodium sulfate and evaporated to dryness in vacuo. The residue is crystallized carefully from 95% alcohol.

EXAMPLE 27

*12α-bromocortisone acetate*

12α-bromohydrocortisone acetate (L) is oxidized with chromic acid-sulfuric acid in acetone as described in Example 2 to yield 12α-bromocortisone acetate.

The invention may be variously otherwise embodied within the scope of the appended claims.

We claim:

1. A 12α-halo steroid of the general formula

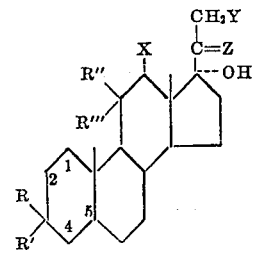

wherein at least one of the positions 1, 2 and 4, 5 is double-bonded, R is hydrogen, R' is selected from the group consisting of hydroxy and acyloxy, and together R and R' is selected from the group consisting of keto, ketal and semicarbazone; R" is hydrogen, R''' is hydroxy, and together R" and R''' is keto; X is α-halo; Y is selected from the group consisting of hydrogen, bromine, hydroxy and acyloxy, and Z is selected from the group consisting of keto, ketal and semicarbazone.

2. 12α-halo-allopregnane-3β,17α-diol-11,20-dione.
3. 12α-halo-allopregnane-3β,17α,21-triol-11,20-dione.
4. 12α-halo-allopregnane-17α,21-diol-3,11,20-trione.
5. 12α-halo-cortisone.
6. 12α-chloro-cortisone.
7. 12α-halo-Δ¹,⁴-pregnadiene-17α-21-diol-3,11,20-trione.
8. 12α - chloro-Δ¹,⁴-pregnadiene-17α,21 - diol-3,11,20-trione.

References Cited in the file of this patent

UNITED STATES PATENTS

| | | |
|---|---|---|
| 2,681,353 | Archer | June 15, 1954 |
| 2,782,211 | Wettstein | Feb. 19, 1957 |